US007259858B2

(12) United States Patent
Tanamachi

(10) Patent No.: US 7,259,858 B2
(45) Date of Patent: Aug. 21, 2007

(54) IMAGING APPARATUS HAVING MEDIA SENSING SYSTEM

(75) Inventor: Steven W. Tanamachi, Lauderdale, MN (US)

(73) Assignee: Carestream Health, Inc., Rochester, NY (US)

( * ) Notice: Subject to any disclaimer, the term of this patent is extended or adjusted under 35 U.S.C. 154(b) by 365 days.

(21) Appl. No.: 10/980,906

(22) Filed: Nov. 4, 2004

(65) Prior Publication Data

US 2006/0091331 A1 May 4, 2006

(51) Int. Cl.
*G01N 21/55* (2006.01)

(52) U.S. Cl. ........................................ 356/445; 250/557

(58) Field of Classification Search ........ 356/443–445; 250/559.4, 557; 101/484
See application file for complete search history.

(56) References Cited

U.S. PATENT DOCUMENTS

| | | | | | |
|---|---|---|---|---|---|
| 3,408,142 | A | * | 10/1968 | Hunt et al. | 355/38 |
| 3,732,016 | A | * | 5/1973 | Deshayes et al. | 356/632 |
| 4,468,562 | A | * | 8/1984 | Wicnienski et al. | 250/372 |
| 4,978,858 | A | | 12/1990 | Ellsworth et al. | |
| 4,985,636 | A | * | 1/1991 | Fukui et al. | 250/559.4 |
| 5,139,339 | A | | 8/1992 | Courtney et al. | |
| 5,230,740 | A | | 7/1993 | Pinneo | |
| 5,349,407 | A | | 9/1994 | Saito et al. | |
| 5,381,130 | A | * | 1/1995 | Thuillard et al. | 340/630 |
| 5,560,355 | A | * | 10/1996 | Merchant et al. | 600/323 |
| 5,585,887 | A | | 12/1996 | Ehara | |
| 5,625,432 | A | | 4/1997 | Omi | |
| 5,892,585 | A | * | 4/1999 | Lianza et al. | 356/405 |
| 6,018,164 | A | | 1/2000 | Mullens | |
| 6,163,654 | A | | 12/2000 | Sasaki et al. | |
| 6,217,168 | B1 | | 4/2001 | Elgee | |
| 6,497,179 | B1 | * | 12/2002 | Allen et al. | 101/484 |
| 2004/0238764 | A1 | | 12/2004 | Yagaguchi et al. | |

FOREIGN PATENT DOCUMENTS

| | | |
|---|---|---|
| EP | 0 602 284 | 6/1994 |
| EP | 1 362 706 | 5/2003 |

* cited by examiner

*Primary Examiner*—Richard A. Rosenberger

(57) ABSTRACT

A system for sensing imaging media along a transport path. System includes a light source positioned proximate to a selected location along transport path. A transducer in optical alignment with light source so as to receive light from light source after light crosses transport path provides an output signal having a frequency representative of the presence of imaging media at the selected location.

27 Claims, 6 Drawing Sheets

IMAGING APPARATUS HAVING MEDIA SENSING SYSTEM

FIELD OF THE INVENTION

The present invention relates generally to an imaging apparatus for generating an image in heat sensitive imaging media, and more specifically to an imaging apparatus employing a system for sensing imaging media along a transport path during the imaging process.

BACKGROUND OF THE INVENTION

Thermal processors typically employ some type of mechanical transport system to move photothermographic film along a transport path through the processor during the development process. For various reasons, it is desirable to know the position of the film as it moves along the transport path, such as to determine whether a film jam has occurred in the transport system or to initiate various processor operations that are dependent on the film's position. As such, several systems have been developed to sense and monitor the position of film along the transport path.

One type of system employs mechanical switches which sense the position of film via physical contact with an actuator mechanism. However, the actuator mechanisms can scratch the sometimes delicate coatings on the photothermographic film or deposit contaminants on the film, both of which may result in defects or artifacts in the developed image. In efforts to avoid such drawbacks, non-contact methods of film detection have been developed.

One such method employs an ultrasonic sensor having a sound source located on one side of the film path and a sound receiver located on the other side, wherein a change in the sound level indicates the presence of film. While ultrasonic systems are effective at detecting film, the high cost of such systems has limited their application. Another method employs photoelectric sensors having a light source located on one side of the film path and a detector located on the other side, wherein a change in the detected light level from a fixed set-point indicates the presence of film. However, due to variables such as component variation, component aging, temperature drift, voltage drift, and light source drift, the amount of light provided by the light source and the light sensed by the detector can vary significantly over time. Consequently, in order to reliably detect film, it is necessary for such systems to employ a wide safety margin from the fixed set-point.

As a result, while such photoelectric sensors work well when the difference in light transmission across the film path is great between film and no-film conditions, they are not always effective at detecting film which is nearly transparent and does not provide a sufficient difference in the amount of light detected between film and no-film readings to enable reliable detection. To improve reliability, many photoelectric systems employ complicated circuitry to maintain the light output of the light source at near constant levels. However, such circuitry can be expensive and increases the space requirements of such sensors.

It is evident that there is a need for improved sensing of film movement through processors, particularly near-transparent film.

SUMMARY OF THE INVENTION

In one embodiment, the present invention provides a system for sensing imaging media along a transport path, the system including a light source positioned proximate to a selected location along the transport path. A transducer is in optical alignment with the light source so as to receive light from the light source after the light crosses the transport path and configured to provide an output signal having a frequency representative of the presence of imaging media at the selected location.

In one embodiment, the present invention provides a detector for monitoring movement of imaging media along a transport path. The detector includes a light source positioned to transmit light across the transport path at a selected location, a sensor, and a controller. The sensor is positioned to receive light from the light source after the light crosses the transport path and configured to provide an output signal having a frequency based on an irradiance of the received light, wherein imaging media positioned at the at least one location affects the irradiance of the received light based on an optical density of the imaging media. The controller is configured to measure the frequency of the output signal, to compare the measured frequency to a threshold frequency, and to provide a control signal indicative of the presence of imaging media at the selected location based on the comparison.

In one embodiment, the controller determines the threshold frequency based on a no-media frequency, wherein the no-media frequency comprises a measured frequency of the output signal when imaging media is known not to be present at the selected location along the transport path. In one embodiment, the controller periodically adjusts the threshold frequency by periodically measuring the no-media frequency and determining an adjusted threshold frequency based on the measured no-media frequency. In one embodiment, the controller adjusts the threshold frequency each time imaging media passes the selected location along the transport path.

By dynamically adjusting the threshold frequency, the sensing of imaging media by a detector according to the present invention is less susceptible to variables such as component aging, temperature drift, voltage drift, and light source drift. As a result, a safety margin, or detection window, employed to reduce false detection of imaging media can be reduced as compared to conventional detectors, thereby enabling detection of near-transparent imaging media. Additionally, by dynamically adjusting the threshold frequency, circuitry associated with maintaining the output of the light source at a substantially constant level is not required, thereby reducing the size and cost of the detector relative to conventional detectors.

DETAILED DESCRIPTION OF THE INVENTION

Figure 1:
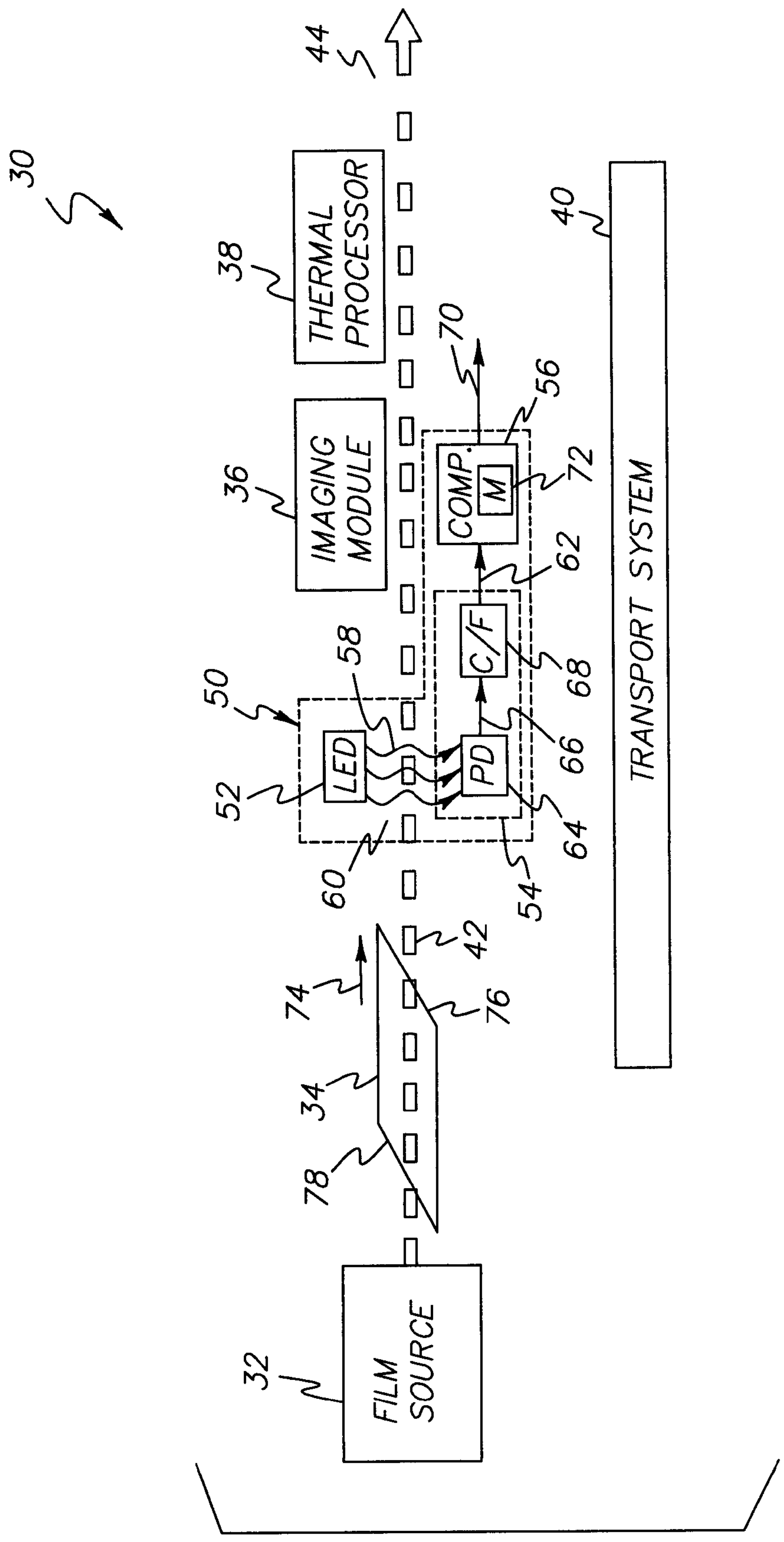
FIG. 1 is a block diagram illustrating generally one exemplary embodiment of a detector according to the present invention.

FIG. 1 is a block diagram illustrating generally an imaging apparatus 30 employing a film detector according to embodiments of the present invention. Imaging apparatus 30 includes a film source 32 containing sheets of unexposed photothermographic imaging media, such as imaging media 34, an imaging module 36, a thermal processor 38, and a transport system 40. Transport system 40 transports imaging media 34 from film source 32 along a transport path 42 to imaging module 36 which exposes imaging media 34 to light representative of a desired image to create a latent image in imaging media 34. In one embodiment, imaging module 36 comprises a laser scanning module. Transport system 40 then moves imaging media 34 along transport path 42 to thermal processor 38 which heats imaging media 34 to thermally develop the latent image. In one embodiment, thermal processor 38 comprises a drum-type thermal processor. The developed imaging media 34 is then moved by transport system 40 along transport path 42 to an exit area 44. An example of an imaging apparatus similar to that described generally by imaging apparatus 30 is described by U.S. Pat. No. 6,007,971 to Star, et al., which is herein incorporated by reference.

Imaging apparatus 30 further includes a detector 50 in accordance with the present invention for sensing the position of imaging media 34 along transport path 42. Detector 50 includes a light source 52, a transducer 54, and a controller 56. Light source 52 is configured to transmit light 58 across a selected location 60 along transport path 42 between light source 52 and transducer 54. In one embodiment, light source 52 comprises a light emitting diode (LED).

Transducer 54 is positioned to receive at least a portion of transmitted light 58 after it crosses transport path 42 and configured to provide a output signal 62 having a frequency based on the irradiance of the received light. In one embodiment, transducer 54 comprises a photodiode 64 configured to convert the received light to a current 66, and a current-to-frequency converter 68 configured to provide output signal 62 based on current 66 from photodiode 64.

Irradiance refers to the density of radiant flux from light source 52 incident upon transducer 54 and is measured as a unit of power per unit area, such as watts/square meter, for example. In one embodiment, the frequency of output signal 62 is directly proportional to the irradiance of the received light. As imaging material 34 moves along transport path 42 and becomes positioned between light source 52 and transducer 54 at location 60, it reduces the irradiance of light received by transducer 54. As a result, the frequency of output signal 62 is reduced as compared to the frequency of output signal 62 when imaging media 34 is not positioned at location 60.

The amount by which the irradiance of light received by transducer 54 and the amount by which the corresponding frequency of output signal 62 are reduced depends on the optical density of imaging media 34. Optical density is a measure of the light transmittance of the imaging media as generally understood by those skilled in the art. Typically, imaging media has a high optical density before processing and optical densities ranging from 0.2 to 3.4 density units after processing. The greater the optical density, the more the irradiance of received light and the amount the frequency of output signal 62 will be reduced.

Figure 2:
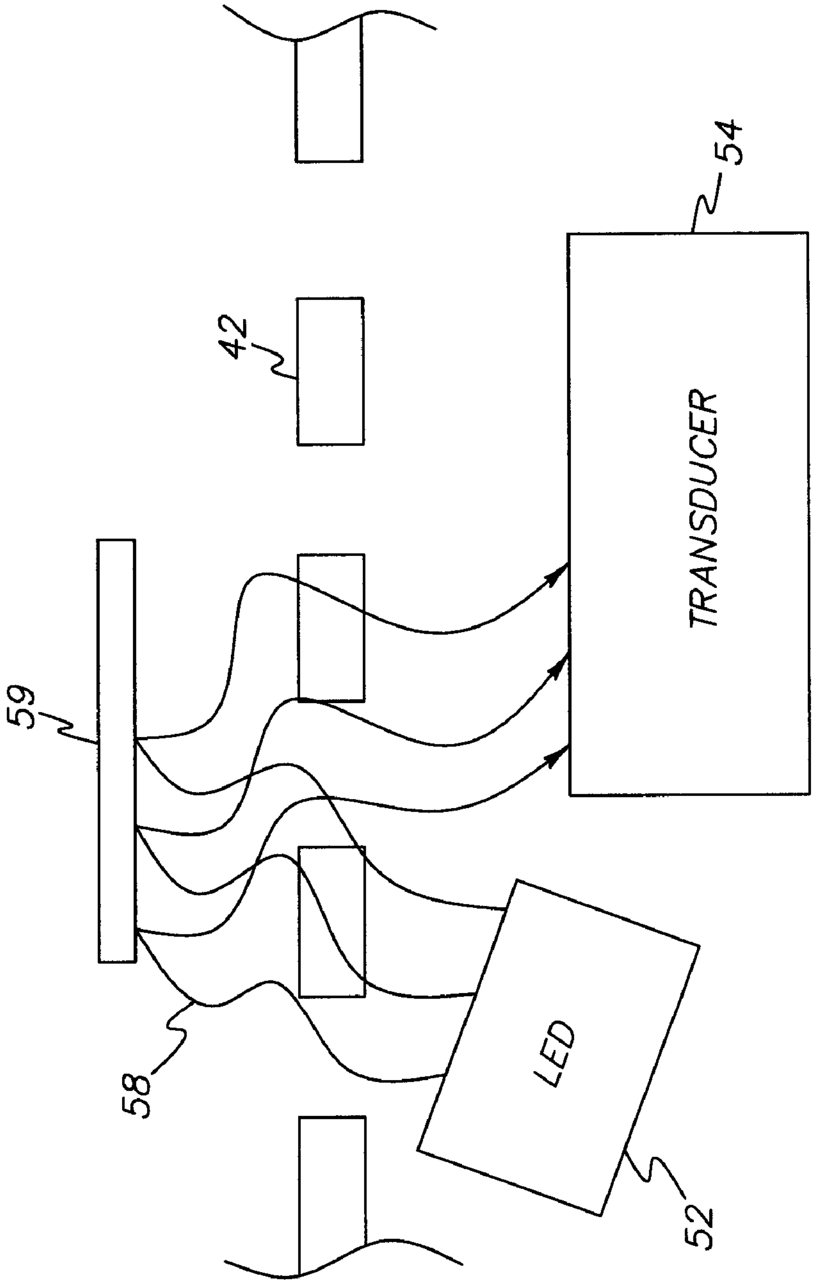
FIG. 2 is a block diagram illustrating generally portions of one embodiment of a film detector according to the present invention.

Although illustrated in FIG. 1 as being on opposite sides of transport path 42, in one embodiment, as illustrated by FIG. 2, light source 52 and transducer 54 are positioned on a same side of transport path 42. In such an embodiment, light 58 transmitted across transport path 42 is redirected by a reflector 59 to transducer 54.

Returning now to FIG. 1, controller 56 is configured to measure the frequency of output signal 62, to compare the measured frequency to a threshold frequency, and based on the comparison, to provide a detector signal 70 indicative of the presence of imaging media at location 60. In one embodiment, the threshold frequency is stored in a memory 72 within controller 56. In one embodiment, controller 56 comprises a microcontroller. In one embodiment, detector signal 70 has a first state, such as a logic "1", indicating the presence of imaging media 34 between light source 52 and transducer 54 when the frequency of output signal 62 is less than the threshold frequency, and a second state, such as a logic "0", indicating that imaging media 34 is not present between light source 52 and transducer 54 when the frequency of output signal 62 greater than or equal to the threshold frequency.

In one embodiment, microcontroller 56 calculates the threshold frequency by measuring the frequency of output signal 62 when imaging media 34 is known not to be positioned between light source 52 and transducer 54, hereinafter referred to as the "no-media" frequency, and reducing the measured no-media frequency by a safety margin. The safety margin is designed to substantially reduce or eliminate the occurrence of controller 56 providing a detector signal 70 having a state that falsely indicates the presence of imaging media 34 at location 60. In one embodiment, the safety margin comprises a frequency value, wherein microcontroller 56 reduces the measured no-media frequency by the safety margin frequency value to determine the threshold frequency. In another embodiment, the safety margin comprises a percentage reduction from the measured no-media frequency. In one embodiment, the safety margin is as low as 10% of the measured no-media frequency (i.e. the threshold frequency is as high as 90% of the no-media frequency).

In one embodiment, microcontroller 56 determines the threshold frequency upon each power-up of imaging apparatus 30. In another embodiment, detector 50 periodically updates the threshold frequency stored in memory 72 during operation of imaging apparatus 30 by periodically measuring the no-media frequency. In another embodiment, as will be described in greater detail below, detector 50 calibrates the threshold frequency stored in memory 72 each time a piece of imaging material, such as imaging media 34, passes location 60.

By dynamically adjusting the threshold frequency stored in memory 72 during operation of imaging apparatus 30; the detection of imaging media by detector 50 according to the present invention is less susceptible to variables such as component aging, temperature drift, voltage drift, and light source drift. As a result, the safety margin, or detection window, employed by detector 50 to reduce false detection of imaging media can be reduced as compared to conventional detectors, thereby enabling detector 50 to reliably detect near-transparent imaging media. In one embodiment, detector 50 is configured to detect imaging media having optical densities of 0.03 density units and greater. Additionally, by dynamically adjusting the threshold frequency, detector 50 does not require circuitry associated with maintaining the light output of light source 52 at a substantially constant level, thereby reducing the size and cost of detector 50 relative to conventional detectors.

Figure 3:
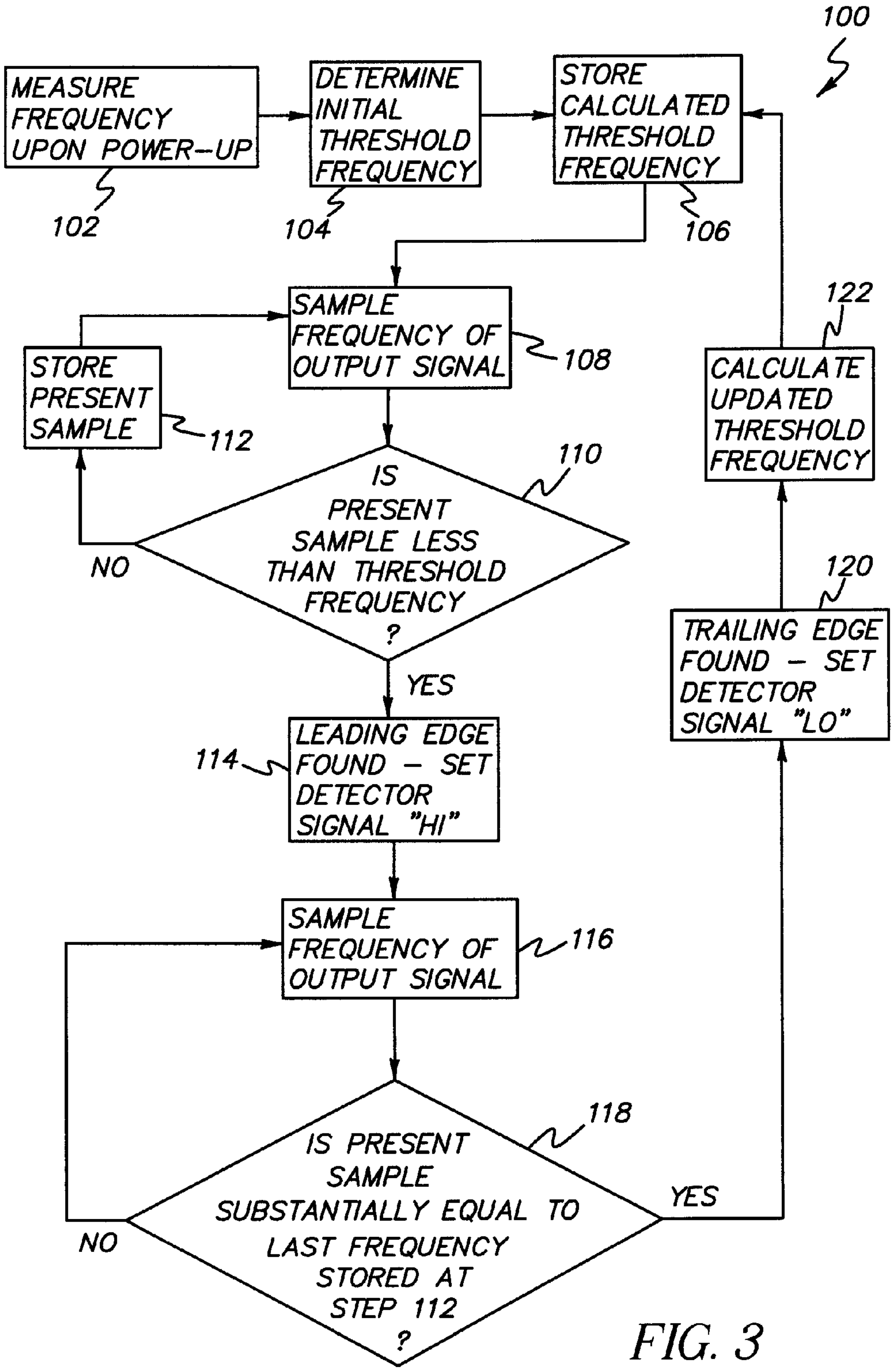
FIG. 3 is a flow diagram illustrating an exemplary process for operating a film detector according to one embodiment of the present invention.

In one embodiment, as mentioned above and described by process 100 as illustrated by FIG. 3, the threshold frequency is updated, or calibrated, each time a piece of imaging media 34 passes between light source 52 and transducer 54. Process 100 begins at 102, where upon power-up of imaging apparatus 30 and prior to any imaging media being moved along transport path 42, microcontroller 56 samples and measures the no-media frequency of output signal 62. At 104, microcontroller 56 determines an initial value for the threshold frequency from the no-media frequency measured at 102 based on a predetermined safety margin. At 106, microcontroller 56 stores the value for the threshold frequency determined at 104 at a first location in memory 72. As mentioned earlier, in one embodiment, the safety margin comprises a percentage reduction from the no-media frequency measured at 102.

During operation, as imaging media 34 moves along transport path 42 (as illustrated by directional arrow 74 in FIG. 1), imaging media 34 will move between LED 52 and transducer 54 at location 60 and reduce the amount of light 58 received by transducer 54, resulting in a reduction of the frequency of output signal 62. At 108, microcontroller 56 samples and measures the frequency of output signal 62. In one embodiment, microcontroller 56 samples the frequency of output signal 62 at a rate of up to 2 milliseconds (ms). In one embodiment, microcontroller 56 samples the frequency of output signal 62 at a rate of 10 ms.

At 110, microcontroller 56 queries whether the frequency of the present sample measured at 108 is less than the threshold frequency stored in memory 72. If the measured frequency of the present sample is greater than or equal to the threshold frequency stored in memory 72, imaging media 34 is not present at location 60, and process 100 proceeds to 112 where microcontroller stores the measured frequency of the present sample at a second location in memory 72, and then returns to 108 to again sample the frequency of output signal 62.

If the measured frequency of the present sample is less than the threshold frequency stored in memory 72, microcontroller 56 determines that a leading edge 76 of imaging media 34 has reached location 60, and process 100 proceeds to 114 where microcontroller 56 provides detector signal 70 having the first state. Process 100 then proceeds to 116, where microcontroller 56 continues to sample and measure the frequency of output signal 62.

As imaging media 34 continues to move between LED 52 and transducer 54, the amount of light 58 received by transducer 54 remains at a reduced level. At 118, microcontroller 56 queries whether the frequency of the present sample measured at 116 is substantially equal to the last measured frequency of output signal 62 stored at the second location in memory 72 at 112, i.e., the last measured no-media frequency of output signal 62 prior to the detection of leading edge 76 of imaging media 34. In one embodiment, substantially equal comprises being within a predetermined range of the frequency stored at the second location in memory 72. In one embodiment, substantially equal comprises being within +/−5% of the frequency stored at the second location within memory 72.

If the answer to the query at 118 is "no", process 100 returns to 116 to again sample output signal 62. If the answer to the query at 118 is "yes", microcontroller 56 determines that a trailing edge 78 of imaging media 34 has reached location 60, and process 100 proceeds to 120 where microcontroller 56 provides detector signal 70 having the second state.

Process 100 then proceeds to 122, where microprocessor 56 determines an updated value for the threshold frequency by reducing the no-media frequency stored at the second location in memory 72 based on the safety margin. Process 100 then returns to 106, where the updated value for the threshold frequency is stored at the first location in memory 72. Procedures 106 through 122 are then repeated for each piece of imaging media 34.

As described above with regard to process 100, the threshold frequency employed by detector 50 is updated for each piece imaging media 34 processed by imaging apparatus 30. As such, detector 50 recalibrates itself for each piece of imaging material. Thus, as described above, the safety margin employed by detector 50 to reduce false detections of imaging media at location 60 can be reduced as compared to other film detectors, thereby enabling detector 50 to sense the presence of imaging media 34 having very low optical densities.

Figure 4:
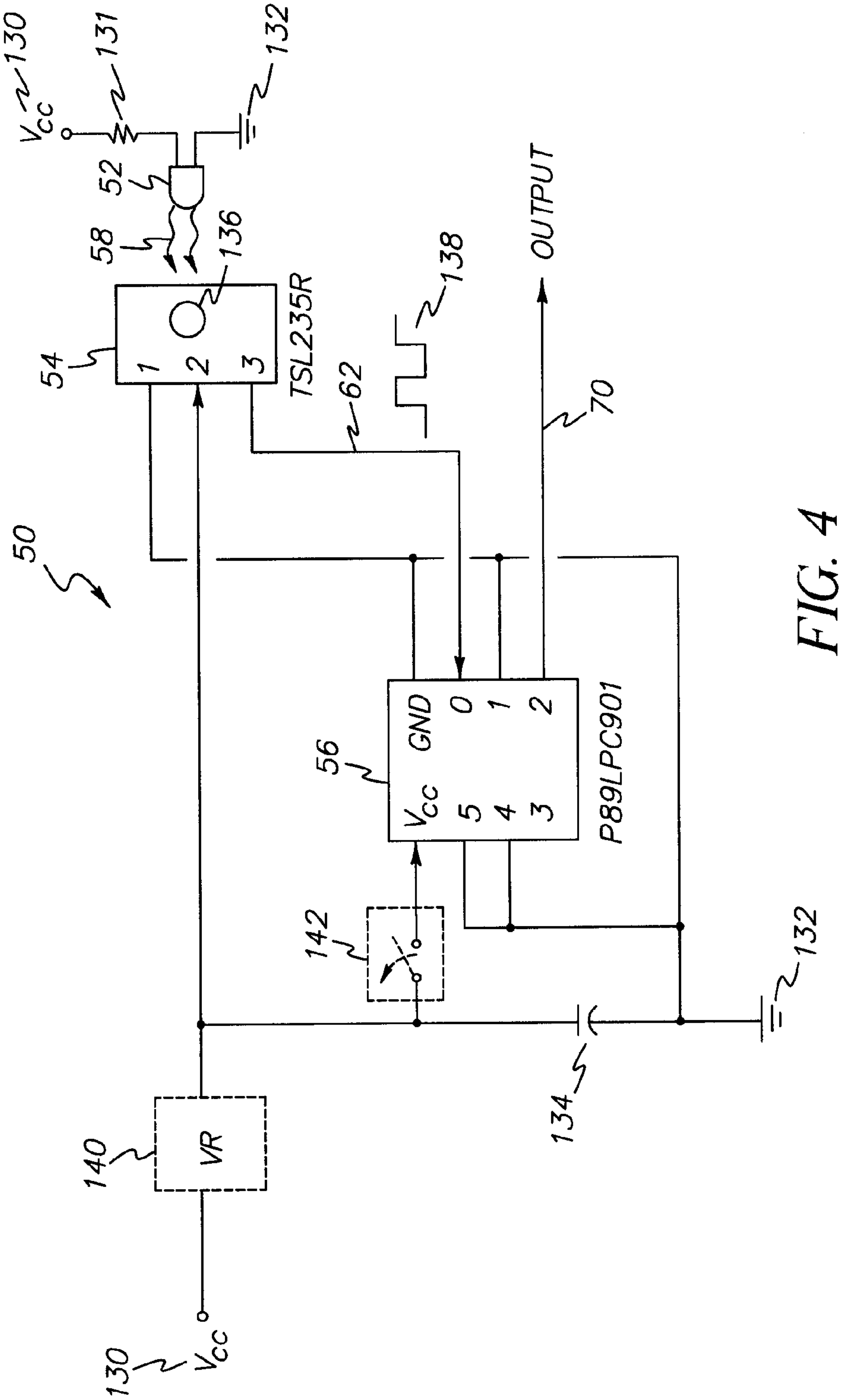
FIG. 4 is a block and schematic diagram illustrating one embodiment of a detector according to the present invention.

FIG. 4 is a block and schematic diagram illustrating one exemplary embodiment of detector 50 according to the present invention including light source 52, transducer 54, and controller 56. Light source 52 comprises an LED having a first terminal coupled to a voltage source (Vcc) 130 via a current setting resistor 131 and a second terminal coupled to ground 132. In one embodiment, as illustrated, transducer 54 comprises a model number TSL235R light-to-frequency converter as manufactured by Texas Advanced Optoelectronic Solutions, Inc. of Plano, Tex., and controller 56 comprises a model number P89LPC901 8-bit microcontroller as manufactured by Philips Electronics. The TSL235R light-to-frequency converter includes an integral photodiode and current-to-frequency converter.

A first terminal of transducer 54 and a ground (GND) terminal and terminals "1", "4" and "5" of microcontroller 56 are connected to ground 132. A second terminal of transducer 54 and a power terminal of microcontroller 56 are connected to Vcc 130. A decoupling capacitor 134 is connected between the power terminal of microcontroller 56 and ground 132. The TSL235R receives light 58 from LED 52 via an integral lensed aperture and provides output signal 62 at a third terminal to a terminal "0" of microcontroller 56. In one embodiment, output signal 62 comprises a square wave as illustrated at 138. Microcontroller 56 measures and compares the frequency of output signal 62 to the threshold frequency stored at an internal memory location and provides detector signal 70 via a terminal "2" based on the comparison.

In one alternate embodiment, detector 50 includes a voltage regulator 140 configured to regulate the level of Vcc 130 provided to transducer 54 and microcontroller 56. In another alternate embodiment, detector 50 includes a switch 142 controllable to interrupt Vcc 130 provided to the power terminal of microcontroller 56. Each time Vcc is interrupted, microcontroller 56 is configured to recalibrate the threshold frequency stored in the internal memory, such as memory 72, based on the frequency of output signal 62 received via terminal "0." Thus, as described above, in one embodiment, Vcc 130 is periodically interrupted via switch 142 when imaging media 34 is known not to be present between LED 52 and transducer 54 such that microcontroller 56 periodically recalibrates the threshold frequency stored at the internal memory location, such as memory location 72.

Figure 5:
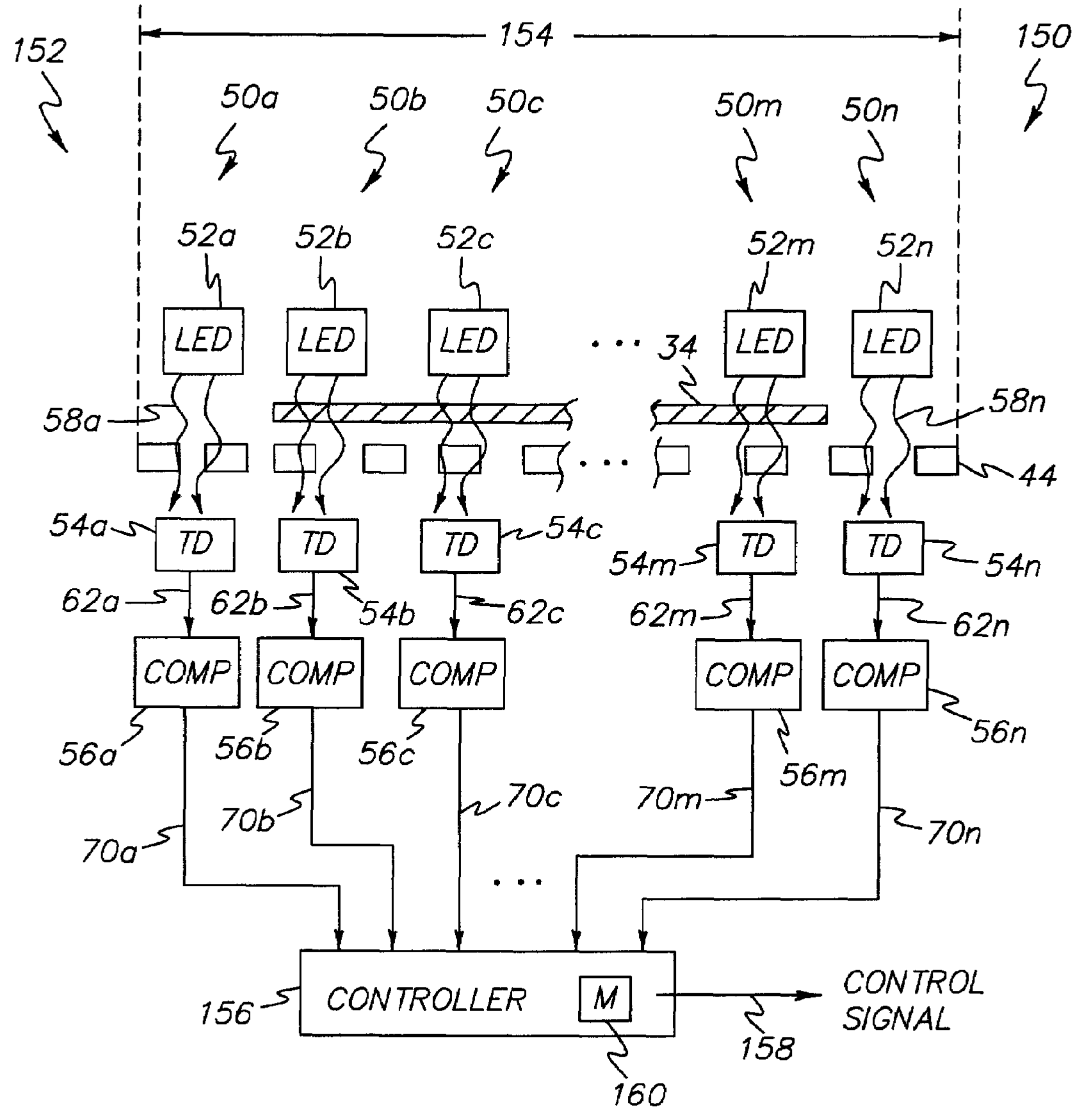
FIG. 5 is a block diagram illustrating generally on embodiment of a monitoring system according to the present invention.

FIG. 5 is a block diagram illustrating one exemplary embodiment of a media monitoring system 150 according to the present invention employing a plurality of detectors 50 to monitor characteristics of the imaging media 34, such as its location and width, for example. Media monitoring system 150 comprises a plurality of detectors 50, illustrated as detectors 50*a* through 50*n*, positioned to form a linear array 152 across a width 154 of transport path 42. In one embodiment, detectors 50*a* through 50*n* are spaced at predetermined intervals across width 154 of transport path 42. In one embodiment, detectors 50*a* through 50*n* are positioned at equally spaced intervals across width 154 of transport path 42. Media monitoring system 150 further includes a controller 156.

Each of the detectors, 50*a* through 50*n*, includes a transducer, 54*a* through 54*n*, which receives light, 58*a* through 58*n*, transmitted across transport path 42 by a corresponding LED, 52*a* through 52*n*. Each transducer, 54*a* through 54*n*, in-turn provides a output signal, 62*a* through 62*n*, having a frequency based on the irradiance of the received light, 58*a* through 58*n*, to a corresponding controller, 56*a* to 56*n*. In one embodiment, the frequency of output signal 62 has a lower value when light 58 is impeded by the presence of imaging media 34 relative to when light 58 in unimpeded by imaging media 34 and free to travel to transducer 54.

Each controller, 56*a* to 56*n*, in-turn provides an detector signal, 70*a* to 70*n*, to a controller 156. Each detector signal, 70*a* to 70*n*, has a state based on a comparison of the frequency of corresponding output signal, 62*a* trough 62*n*, to a threshold frequency stored within a memory, such as memory 72 as illustrated in FIG. 1. In one embodiment, each controller 56*a* to 56*n* provides an detector signal, 70*a* to 70*n*, having a first state, such as a logic "1", when the frequency of corresponding output signal, 62*a* to 62*n*, is less than the threshold frequency and having a second state, such as a logic "0", when the frequency of corresponding output signal, 62*a* to 62*n*, is greater than or equal to the threshold frequency.

Controller 156 provides a control signal 158 indicative of a characteristic of imaging media 34 based on the states of detector signals 70*a* through 70*n*. In one embodiment, controller 156 provides control signal 158 indicative of the width of imaging media 34 by counting the number of detector signals 70*a* through 70*n* having the first state. Imaging media 34 typically comprises a plurality of standard sizes, such as 8"×10", 12"×12" and 14"×17", for example. By counting the number of detector signal 70*a* through 70*n* having the first state, and based on the predetermined spacing between detectors 50*a* through 50*n*, controller 156 is able to determine the width of imaging media 34. In one embodiment, controller 156 compares the number of detector signals 70*a* through 70*n* having the first state to a look-up table located in a memory 160 to determine the width of imaging media 34. In one embodiment, controller 156 provides control signal 158 indicating the presence of imaging media 34 when at least one of the detector signals 70*a* through 70*n* has the first state.

Figure 6:
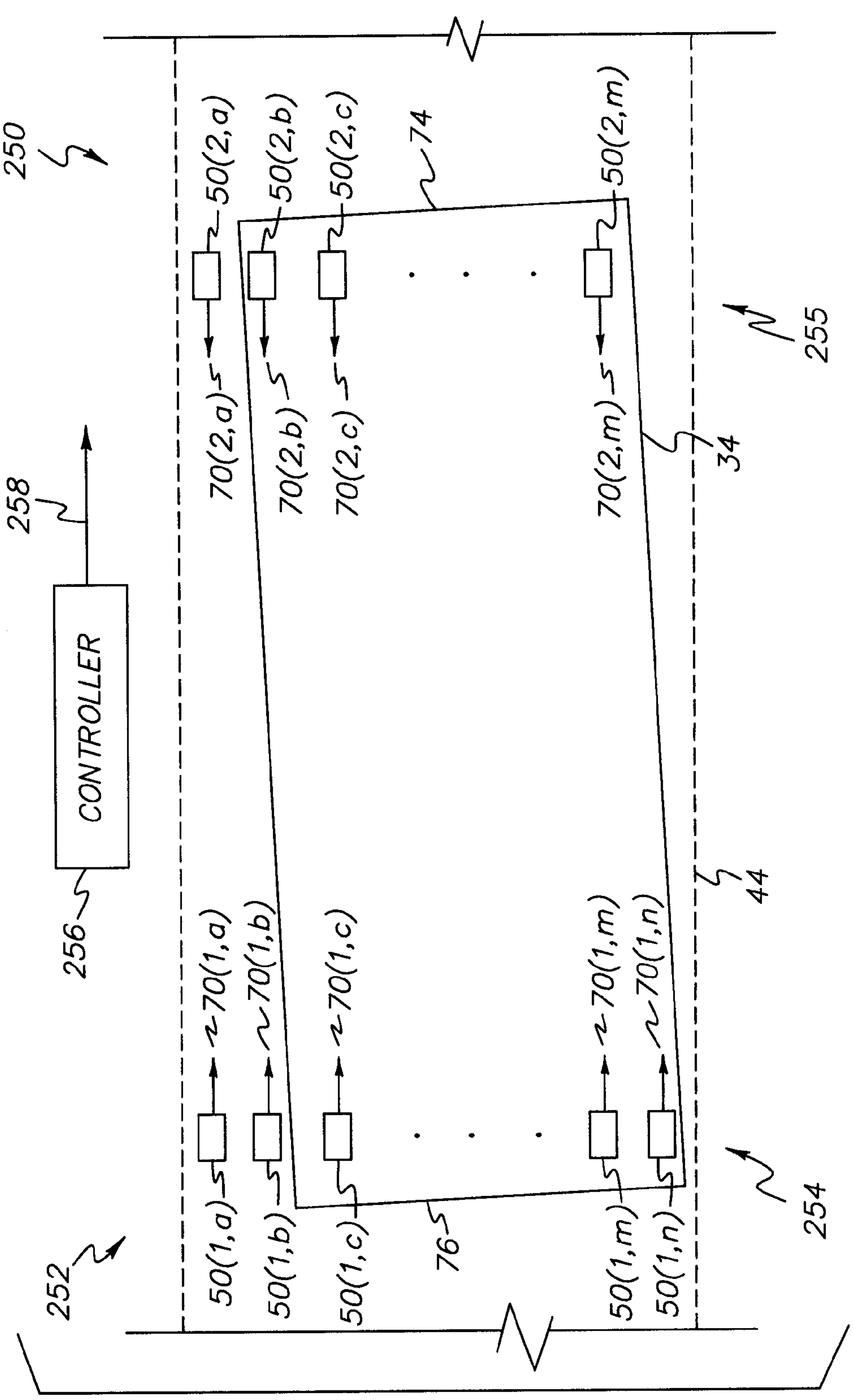
FIG. 6 is a block diagram illustrating generally on embodiment of a monitoring system according to the present invention.

FIG. 6 is a block diagram illustrating one exemplary embodiment of a media monitoring system 250 according to the present invention employing a plurality of detectors 50 to monitor characteristics of imaging media 34, such as its location along transport path 42, its width, and whether it is skewed relative to transport path 42. Media monitoring system 250 comprises a plurality of detectors 50 positioned to form a matrix 252 across a portion of transport path 42, matrix 252 comprising a first column 254 of detectors, illustrated as detectors 50(1,*a*) through 50(1,*n*), and a second column of detectors, illustrated as detectors 50(2,*a*) through 50(2,*n*). Media monitoring system 250 further includes a controller 256.

In a fashion similar to that described above relative to linear array 152 of FIG. 5, each of the detectors 50 of matrix 252 provides a corresponding detector signal 70, illustrated as detector signals 70(1,*a*) through 70(2,*n*), having a first state, such as a logic "1", when imaging media 34 is present along transport path 42 and a second state, such as a logic "0", when imaging media 34 is not present along transport path 42. Controller 256 receives each of the detector signals 70 from matrix 252 of detectors 50 and provides a control signal 258 indicative of a characteristic of imaging media 34 based on the states of detector signals 70(1,*a*) through 70(1,*b*).

In one embodiment, controller 256 provides control signal 258 indicative of whether imaging media 34 is skewed relative to transport path 42 by comparing which rows, "a" through "n", of detectors 50 of first column 254 have detector signals 70 having the first state to which rows, "a" through "n", of detectors 50 of second column 255 have detector signals 70 having the first state. For example, as illustrated by FIG. 6, the detectors 50(1,*c*) through 50(1,*n*) of first column 254 have corresponding detector signals 70(1,*c*) through 70(1,*n*) having the first state, while the detectors 50(2,*b*) through 50(2,*m*) of second column 255 have corresponding detector signals 70(2,*b*) through 70(2,*m*) having the first state. Thus, since the rows "c" through "n" of column 254 having the first state do not match the rows "b" through "m" of column 255 having the first state, controller 256 provides control signal 258 indicating that imaging media 34 is skewed relative to transport path 42.

In one embodiment, in a fashion similar to that described above with respect to controller 156 of FIG. 5, controller 256 provides control signal 258 indicative of a width of imaging media 34 by counting the number of detector signals 70 of either column 254 or 255 having the first state. In one embodiment, also in a fashion similar to that described above with respect to controller 156 of FIG. 5, controller 256 provides control signal 258 indicative of the position of imaging media 34 along transport path 42 when at least one detector signal 70 of either column 254 or 255 has the first state.

Although not illustrated above, it should be noted that media monitoring system 150 of FIG. 5 can also be configured to detect skew of imaging media 34. In such an embodiment, controller 156 is configured to compare the states of detector signals 70*a* through 70*n* when the leading edge 76 of imaging media 34 is detected to the states of detector signals 70*a* through 70*n* just prior to when the trailing edge 78 of imaging media 34 is detected. If the states of detector signals 70*a* through 70*n* do not match, controller 156 provides a control signal 158 indicating that imaging media 34 is skewed relative to transport path 42.

The invention has been described in detail with particular reference to certain preferred embodiments thereof, but it will be understood that variations and modifications can be effected within the spirit and scope of the invention.

PARTS LIST

30 Imaging Apparatus
32 Film Source
34 Imaging Media
36 Imaging Module
38 Thermal Processor
40 Transport System 42 Transport Path
44 Exit Area
50 Detector
52 Light Source
54 Transducer
56 Controller
58 Transmitted Light
59 Reflector
60 Detector Location
62 Output signal
64 Photodiode
66 Current
68 Current-to-Frequency Converter
70 Detector signal
72 Memory
74 Directional Arrow
76 Imaging Media—Leading Edge
78 Imaging Media—Trailing Edge
100 Process Flow Diagram
102-122 Process Procedures
130 Voltage Source
131 Current Setting Resistor
132 Ground
134 Decoupling Capacitor
136 Lensed Aperture
138 Square Wave
140 Voltage Regulator
142 Switch
150 Media Monitoring System
152 Linear Array of Detectors
154 Transport Path—Width
156 Controller
158 Control Signal
160 Memory
250 Media Monitoring System
252 Matrix of Detectors
254 First Column of Detectors
255 Second Column of Detectors
256 Controller
258 Control Signal

What is claimed is:

1. A detector for monitoring movement of imaging media along a transport path, the detector comprising:
- a light source positioned to transmit light across the transport path at a selected location;
- a sensor positioned to receive light from the light source after the light crosses the transport path and configured to provide an output signal having a frequency based on an irradiance of the received light, wherein imaging media positioned at the at least one location affects the irradiance of the received light based on an optical density of the imaging media; and
- a controller configured to measure the frequency of the output signal, to compare the measured frequency to a threshold frequency, and to provide a control signal indicative of the presence of imaging media at the selected location based on the comparison;
- wherein the controller determines the threshold frequency based on a no-media frequency, wherein the no media frequency comprises a measured frequency of the output signal when imaging media is known not to be present at the selected location along the transport path; and
- wherein the controller periodically adjusts the threshold frequency by periodically measuring the no-media frequency and determining an adjusted threshold frequency based on the measured no-media frequency.

2. The detector of claim 1, wherein the controller determines the threshold frequency by reducing the no-media frequency by a safety margin.

3. The detector of claim 2, wherein the safety margin is as low as ten percent of the no-media frequency.

4. The detector of claim 2, wherein the safety margin comprises a value that enables the detector to sense imaging media having optical densities as low as 0.03 density units.

5. The detector of claim 2, wherein the safety margin is substantially equal to twenty percent of the no-media frequency.

6. The detector of claim 1, wherein the controller adjusts the threshold frequency at a regular interval.

7. The detector of claim 1, wherein the controller adjusts the threshold frequency after each time imaging media passes the selected location along the transport path.

8. The detector of claim 1, wherein the controller measures the frequency of the output signal every two milliseconds.

9. The detector of claim 1, wherein the frequency of the output signal is proportional to the irradiance of the received light.

10. A system for monitoring imaging media along a transport path, the system comprising:
- a plurality of detectors positioned along the transport path, wherein the plurality of detectors are spaced at intervals to form a linear array across a width of the transport path, each detector located at a different position in the linear array, each detector comprising:
- a light source transmitting light across the transport path at a selected location;
- a transducer receiving at least a portion of the light after the light crosses the transport path and providing an output signal having a frequency based on an intensity of the received light; and
- a controller configured to compare the frequency of the output signal to a threshold frequency and to provide a detector signal indicative of the presence of imaging media at the selected location based on the comparison; and
- a monitor configured to provide a control signal related to a characteristic of the imaging media based on the detector signal from each detector.

11. The system of claim 10, wherein the monitor is configured to provide a control signal indicative of a width of the imaging media by counting a number of detectors of the linear array having a detector signal indicating that imaging media is present at the selected location.

12. The system of claim 10, wherein the monitor is configured to provide a control signal indicative of whether the imaging media is skewed relative to the transport path by comparing the positions of detectors in the linear array having detector signals indicating that imaging media is present at a first time to the positions of detectors in the linear array having detector signals indicating that imaging media is present at a second time.

13. The system of claim 10, wherein the monitor provides a control signal indicating that the imaging media is skewed relative to the transport path when the positions of detectors in the linear array having detector signals indicating that imaging media is present at the first time do not match the positions of detectors in the linear array having signals indicating that imaging media is present at the second time.

14. The system of claim 10, wherein the monitor provides a control signal indicating that imaging media is present at the selected location when any one of the detectors of the linear array has a detector signal indicating that imaging media is present at the selected location.

15. The system of claim 10, wherein the plurality of detectors are spaced to form a matrix, the matrix comprising at least a first and a second column of detectors positioned respectively at first and second selected locations along the transport path, each column comprising a plurality of detectors with each detector located at a different row position across a width of the transport path.

16. The system of claim 15, wherein the monitor is configured to provide a control signal indicative of whether the imaging media is skewed relative to the transport path by comparing the row positions of detectors of the first column to row positions of detectors of the second column having detector signals indicating that imaging media is present.

17. The system of claim 15, wherein the monitor is configured to provide a control signal indicating that imaging media is respectively present at the first and second selected positions when any one of the detectors of the first and second columns has a detector signal indicating that imaging media is present.

18. The system of claim 15, wherein the monitor is configured to provide a control signal indicative of the width of the imaging media by counting a number of detectors in any one of the columns of the matrix having a detector signal indicating that imaging media is present.

19. The system of claim 10, wherein the system includes a laser imager.

20. The system of claim 10, wherein the system includes a thermal processor.

21. A method of monitoring the position of imaging media along a transport path, the method comprising:

transmitting light across a selected location along the transport path;

receiving at least a portion of the light after the light crosses the transport path;

converting the received light to an output signal having a frequency indicative of the presence of imaging media at the selected location;

measuring the frequency of the output signal;

comparing the measured frequency to a threshold frequency; and providing a control signal indicative of whether imaging media is present at the selected location based on the comparison; and periodically updating the threshold frequency.

22. The method of claim 21, wherein converting the received light includes converting the received light to an output signal having a frequency based on an intensity of the received light.

23. The method of claim 21, further comprising:

determining the threshold frequency based on a no-media frequency, wherein the no-media frequency comprises a measured frequency of the output signal when imaging media is known not to be present at the selected location.

24. The method of claim 21, further comprising:

updating the threshold frequency each time imaging media passes the selected location along the transport path.

25. A system for sensing imaging media along a transport path, the system comprising:

means for transmitting light across a selected location along the transport path;

means for receiving at least a portion of the light after the light crosses the transport path;

means for converting the received light to an output signal having a frequency based on an intensity of the received light and indicative of the presence of imaging media at the selected location;

means for measuring the frequency of the output signal;

means for comparing the measured frequency to threshold frequency; and means for providing a control signal indicative of whether imaging media is present at the selected location based on the comparison; and means for periodically updating the threshold frequency.

26. The system of claim 25, further comprising:

means for determining the threshold frequency based on a no-media frequency, wherein the no-media frequency comprises a measured frequency of the output signal when imaging media is not present at the selected location.

27. The system of claim 25, wherein said means for updating updates the threshold frequency each time imaging media passes the selected location along the transport path.

* * * * *